Dec. 31, 1929.　　　C. H. BATES　　　1,742,173
MACHINE AND METHOD FOR ASSEMBLING SCREW PARTS OR THE LIKE
Filed Aug. 19, 1927　　　3 Sheets-Sheet 1
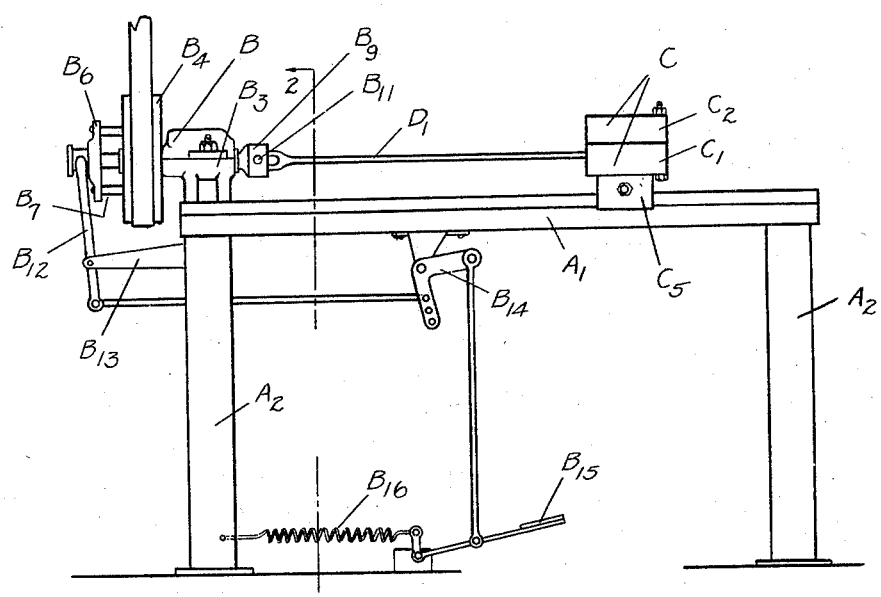
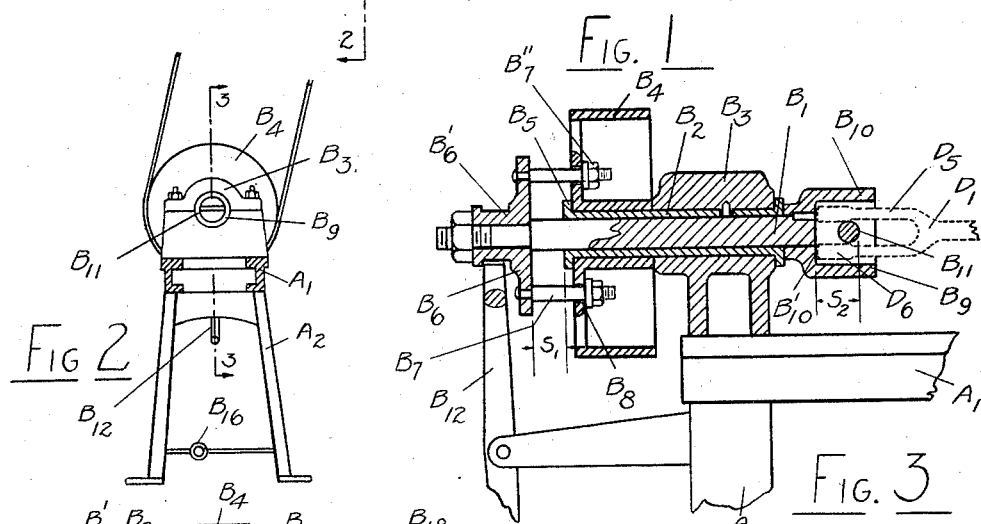
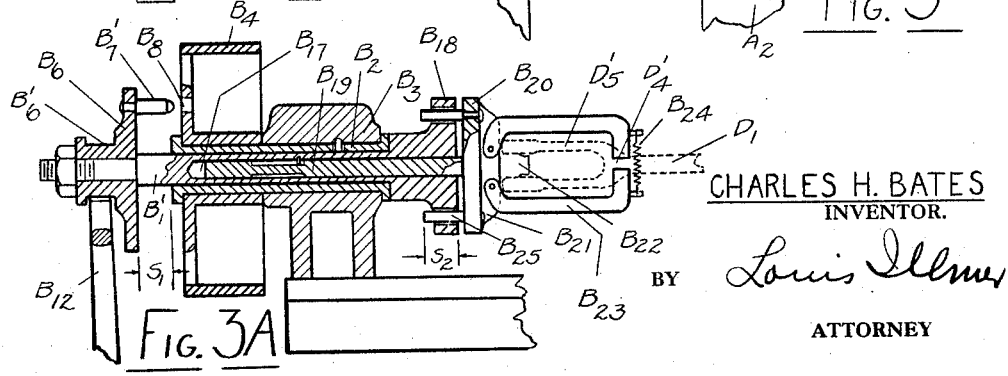
CHARLES H. BATES
INVENTOR.
BY Louis Illmer
ATTORNEY Dec. 31, 1929.                C. H. BATES                1,742,173
       MACHINE AND METHOD FOR ASSEMBLING SCREW PARTS OR THE LIKE
                  Filed Aug. 19, 1927        3 Sheets-Sheet 2
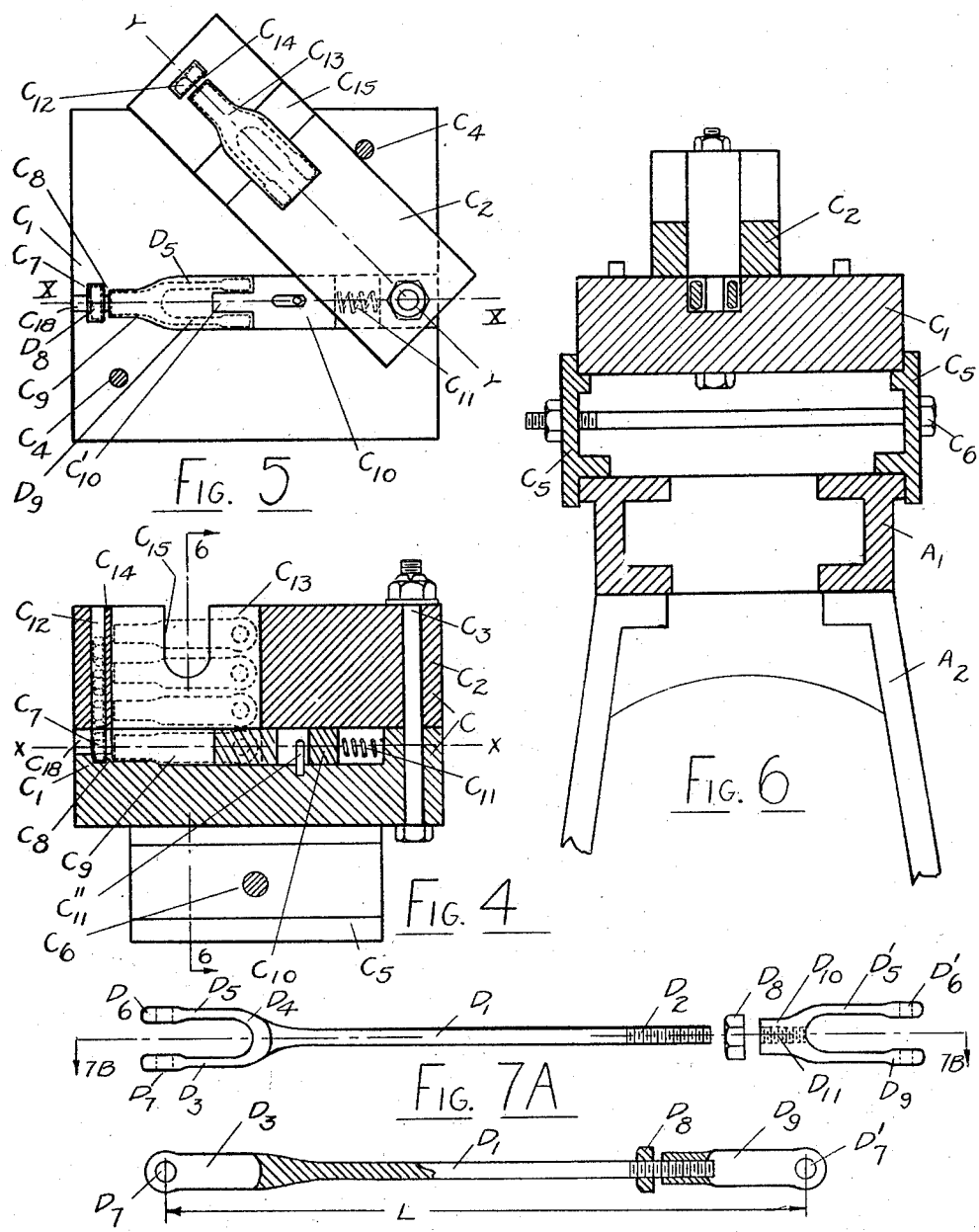
CHARLES H. BATES INVENTOR.
BY *Louis Illmer*
ATTORNEY Dec. 31, 1929.  C. H. BATES  1,742,173
MACHINE AND METHOD FOR ASSEMBLING SCREW PARTS OR THE LIKE
Filed Aug. 19, 1927  3 Sheets-Sheet 3
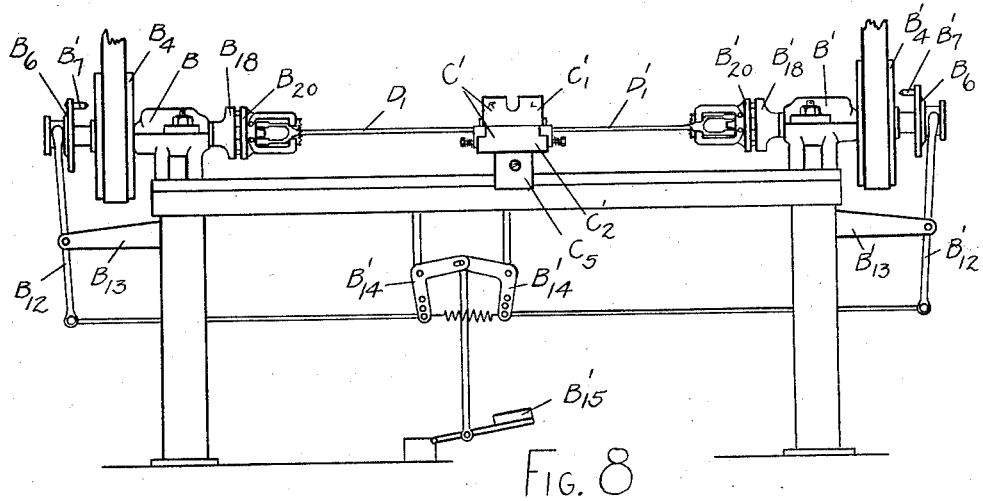
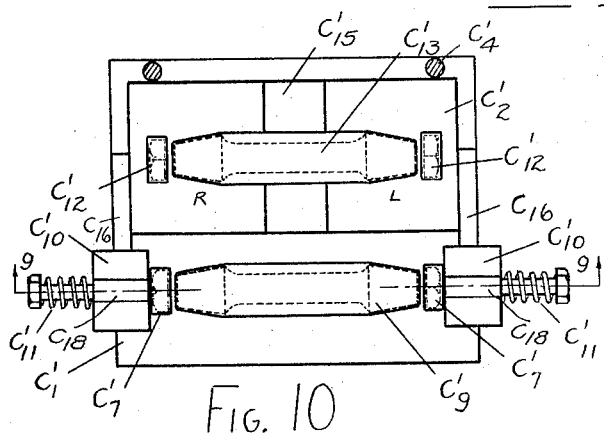
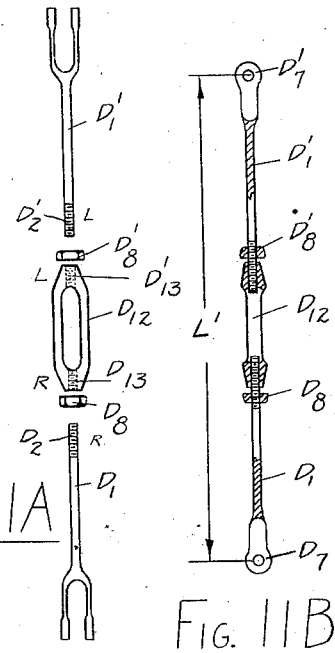
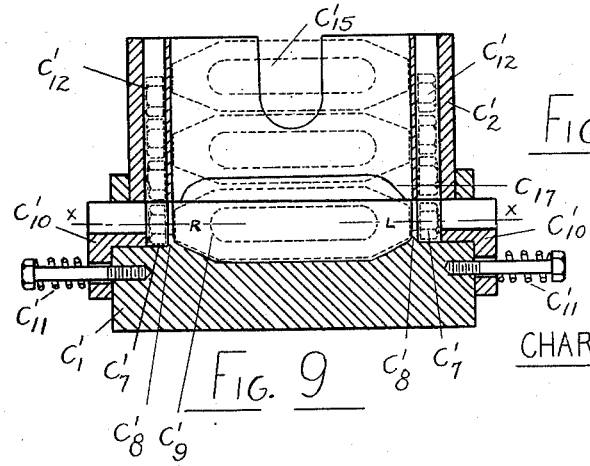
CHARLES H. BATES INVENTOR.
BY Louis Illmer.
ATTORNEY Patented Dec. 31, 1929

1,742,173

UNITED STATES PATENT OFFICE

CHARLES H. BATES, OF CORTLAND, NEW YORK, ASSIGNOR TO THE BREWER-TITCHENER CORPORATION, OF CORTLAND, NEW YORK, A CORPORATION OF NEW YORK

MACHINE AND METHOD FOR ASSEMBLING SCREW PARTS OR THE LIKE

Application filed August 19, 1927. Serial No. 214,052.

This invention relates to machine means for economically assembling male and female parts of the screw type, and is more particularly directed to a rapid method for handling adjustable yoke-ended brake-rods or similar link members, and screwing up the component parts thereof to a predetermined link length of thread depth.

One of the primary objects of my improvements is to eliminate the need for assembling and screwing together numerous mated parts of this kind by hand and to substitute therefor machine means of the automatic hopper-fed type which not only saves considerable time and labor but is especially adapted to screw up a plurality of tapped female elements upon a single threaded rod element, to the end that separately fabricated and completely threaded brake-rod parts in particular may be assembled into units upon a productive scale and properly adjusted into fixed rod lengths and without further manipulation, made ready to take their intended place as operable machine members in a completed automobile, engine or the like. Delivery service of this sort is being exacted from parts makers by new equipment manufacturers in order to expedite the modern mass productive methods now in vogue.

As an instance of such new equipment needs, the rigging required in the case of a brake-rod gear for motor vehicle purposes, generally comprises a foot pedal and also an emergency hand lever, which are operatively interconnected to their respective brake bands through the medium of sets of coupled brake-rod links of the kind which my machine is designed to assemble in units. The ends of such rods are usually equipt with yoke ends of the fork type provided with apertures adapted to engage with suitable lever pins; one or both end portions of such assemblies are ordinarily supplied with adjustable rod take-up means of the screw type serving to shorten or lengthen the pitch distance between the yoke-end apertures; upon completion of such adjustment the threaded rod ends are usually locked in place by means of jamb nuts. An outstanding feature of the present invention resides in providing improved means for simultaneously assembling more than one interiorly threaded nut element upon a single screw rod member.

The component push or pull rod parts are generally made up as forgings; in their simpler form, a forked yoke-end may be made integral with one end of the rod proper while the other rod-end may be threaded to receive the tapped shank of a separately forged complementary yoke-end. As an alternative, a pair of threaded companion rods may be used each such being equipt at its one end with an integral yoke-end and adapted at its other end to screw into a common turn-buckle connector. It is the further purpose of my machine to handle either of such brake-rod assemblies and to likewise screw up their threaded component parts including necessary jamb nuts, into any desired length falling within the range of intended adjustment.

The means whereby said yoke-end parts may be expeditiously assembled, essentially comprise a power-driven spindle provided with a releasable rod anchorage member adapted to transmit a screwing-up movement between the male and female screw parts, said anchorage being automatically released to interrupt further operation after the threads have been screwed together to a predetermined depth.

In addition, there are provided axially yieldable thrust block means adapted to compensate for misalignment on part of adjacent nut threads and which device makes possible to simultaneously screw plural nut members upon a single rod thread without troublesome jamming effects.

To this end and the accomplishment of other new and useful results, my invention further consists in a certain novel assembly method together with constructive features, combination and arrangement of its several parts, all of which will hereinafter be more fully described and claimed.

Reference is had to the accompanying three sheets of drawings which illustrate an embodiment of this invention as applied to the assembling of brake-rod yoke-ends, in which like characters of reference indicate like parts, and in which drawings:

Fig. 1 is a vertical elevation showing a general arrangement of my machine for screwing together simple two-part yoke-end assemblies, while Fig. 2 shows an end view thereof.

Fig. 3 represents a vertical sectional view of the head stock members of my machine taken longitudinally of the spindle along line 3—3 of Fig. 2.

Fig. 3A indicates an alternative style of head stock as provided with a modified rod gripping device.

Fig. 4 is a longitudinal sectional view directed to my tail stock members as fashioned into a magazine chamber with the top and bottom blocks thereof shifted into their closed or operative position.

Fig. 5 is a plan or top view of Fig. 4 showing the magazine blocks shifted apart into inoperative position, while Fig. 6 shows a transverse sectional view as taken along line 6—6 of Fig. 4.

Fig. 7A indicates the unassembled component parts of the article upon which the above identified machine operates to bring them into the assembled relation shown by Fig. 7B.

Fig. 8 shows in vertical elevation, the general arrangement of a duplex machine similar to Fig. 1 but modified to handle a pair of yoke-ended rods and interconnect same by turn-buckle means.

Fig. 9 represents a vertical sectional view of a magazined tail stock that is similar to Fig. 4 but adapted to feed turn-buckles and two nuts in connection therewith, while Fig. 10 is a top view thereof with the upper feed block shifted into its inoperative position.

Fig. 11A indicates component rod members of the turn-buckle type which the Fig. 8 machine is intended to assemble into their screwed-up condition represented by Fig. 11B.

Referring now to the structural details disclosed by said drawings, my machine preferably comprises a pair of longitudinally disposed frame girders of the conventional type such as the bed member $A_1$ which is shown mounted upon a set of spaced legs $A_2$; this machine also comprises a power-driven head stock B and also a tail stock member C that is here fashioned into a magazine chamber adapted to feed threaded stub ends and nuts for rod assembly purposes.

This head stock B may be mounted to adjustably slide along the bed $A_1$ and in the form shown in Fig. 3, said stock is provided with a suitable spindle $B_1$ rotatably seated upon the bushing $B_2$ which latter part may be fixedly held in place by a split bearing pedestal such as $B_3$. A power-driven pulley or equivalent drive means $B_4$ may be loosely mounted about the overhanging end portion of said bushing, there being a bush shoulder or abutment $B_5$ for keeping the pulley hub adjacent to the outermost end of the pedestal cap. Secured to the head or outer end of the spindle $B_1$ is a clutch flange $B_6$ which may be provided with one or more coupling pins $B_7$ adapted to slidably center in a pulley aperture such as $B_8$. The purpose of the aforesaid shiftable drive arrangement is to allow an axial reciprocative movement of the rotating spindle $B_1$ within prescribed limits such as are marked "$S_1$" in Fig. 3 and when the spindle $B_1$ is manually moved into its extreme rightward stroke position, the flange $B_6$ will be stopped by the abutment $B_5$, whereupon the rotating spindle is intended to be held in this dwell position until the screwing up of the threaded rod end causes a progressive and automatic withdrawal of the other or fork rod end from the socketed impelling member $B_9$.

In the present instance, the pins $B_7$ are purposely kept long enough to maintain coupled engagement with the pulley aperture $B_8$ throughout said longitudinal movement of the spindle. The free outward end of one or more such coupling pins may be equipt with an adjustable stop nut $B''_7$ adapted to alter the effective travel $S_1$ and which serves to modify the predetermined turns with which the threaded parts are allowed to screw together.

Opposite said coupling end, the spindle $B_1$ is provided with a jaw-like driver or impelling member $B_9$ which is here shown as having a hollowed yoke-end receiving chamber $B_{10}$ that is symmetrically disposed about the spindle axis and adapted to guide the spaced fork arms $D_5$ of a yoke-end into a slidable straddled relation with respect to the transverse impelling pin $B_{11}$, the yoke-end such as $D_1$ being preferably slipped into the rounded mouth of said socket chamber $B_{10}$ and made to abut against the rear wall $B'_{10}$ thereof in the fashion indicated by dotted lines in Fig. 3.

The described type of socketed impelling member $B_9$ is especially suitable for yoke-ends whose fork arms are relatively short and reasonably rigid to permit of this mode of drive. In the event the spaced fork arms $D_5$ should have to be made abnormally long or otherwise become unduly springy, it is preferred to resort to the modified drive structure shown in Fig. 3A which is equipt with a separate drive releasing means of the clutch type. The inmost end of the modified spindle $B'_1$ is here provided with a central tubular socket $B_{17}$ and surrounding this is an apertured spindle flange $B_{18}$ as carried by the spindle. Slidably mounted within said socket $B_{17}$ is a guide stem $B_{19}$ whose overhung end may be equipt with a clutch disk $B_{20}$ having a transversely disposed lug projection $B_{21}$ and a yoke centering pin $B_{22}$. Straddling said lug and pivotally mounted thereon are complementary yoke-gripping jaws such as $B_{23}$ of which the free terminals may be resiliently sprung together by a jaw spring $B_{24}$ in order to laterally support and firmly grip the mounted yoke end rod behind its hub $D'_4$ as shown.

The disk $B_{20}$ may further be equipt with one or more short clutch pins $B_{25}$ respectively adapted to slide into and withdraw from registering apertures of the flange $B_{18}$ such that when the driven yoke-end rod $D_1$ (shown by dotted lines in Fig. 3A) should be drawn far enough away from the rotating spindle $B'_1$, said rod will no longer be turned by the disengaged pins $B_{25}$; hence by altering the pin length, the number of effective screw turns may be fixed to suit the work in hand and thus again automatically stop screwing up the assembled yoke-end parts beyond fixed predetermined limits. If desired, the spindle $B'_1$ may also be equipt with additional clutch stop means, this being readily incorporated by shortening the coupling pin $B_7$ of Fig. 3 into the pointed disengageable pin $B'_7$ disclosed in Fig. 3A.

Suitable actuating gear for axially reciprocating the spindle $B_1$ is shown in Figs. 1 and 3. The clutch flange $B_6$ is here provided with a hub groove $B'_6$ and engaged by a forked shifting lever $B_{12}$ that is fulcrumed intermediate its ends upon the leg arm $B_{13}$; said lever is in turn linked to the bell-crank $B_{14}$ and operated by the foot treadle $B_{15}$ against the return spring $B_{16}$. When this spring raises the treadle, the spindle $B_1$ together with its impelling member $B_9$ will be shifted into the initial or outermost position shown in Fig. 3.

Taking up in detail the structural features of my magazine member C, as shown in Figs. 4 to 6 this may comprise a normally stationary rectangular holder or lower block $C_1$ upon which is superimposed a similarly shaped feed chamber block $C_2$; these block parts may be tied together by a fulcrum dowel $C_3$ so as to permit the upper block to be shifted laterally out of its normal position into oblique relation Y—Y as represented in full lines by Fig. 5, there being stop pins $C_4$ provided to limit such travel with respect to said bottom block. The latter block $C_1$ may be mounted upon a suitable carriage-like member provided with clamp plates $C_5$ adapted to interlockingly grip the bed girder $A_1$ to allow of adjustably sliding my last stock therealong when the clamp screw $C_6$ is released.

The holder or die block $C_1$ is preferably recessed to receive the component female yoke-end parts which are to be assembled by my machine. In the present disclosure there are two such compartments provided for; one, a nut recess $C_7$ located near the end face of the lower block and shaped to snugly receive a hexagon or other irregularly surfaced jamb nut $D_8$ for the purpose of holding it against rotation and also to position its thread axis in alignment with the center line X—X which in turn, is intended to coincide with the projected spindle axis. Concentric with said axis X—X, a block depression such as $C_{18}$ may further be disposed in each side wall portion of the nut recess $C_7$ of which the outermost depression nearest the impeller $B_9$ initially supports the free threaded end of the inserted rod $D_2$ and serves to guide the same into engagement with the pocketed joint nut $D_8$.

Closely adjacent to said nut recess $C_7$ but preferably kept slightly spaced therefrom by means of the partition collar $C_8$, is a similar compartment $C_9$ adapted to wholly receive a separate yoke-end fork member $D_9$ (see Fig. 5), while the desired depressed position of such female elements prior to assembly upon their common cooperating rod thread, is indicated by dotted lines in Fig. 4. In order to facilitate screwing such rod through both of the aligned members $D_8$ and $D_9$, one such may be yieldingly held against rod thrust by means of a compensating block $C_{10}$ which if desired may be slidably mounted within an extension of the yoke-end compartment $C_9$, a stop pin such as $C''_{11}$ being used as a stop means to limit the outward compensating stroke under action of the thrust spring $C_{11}$. Said retractable compensating block as made yieldable lengthwise of the rod screw axis, represents an important relief provision in that it greatly facilitates the simultaneous screwing up thereon of both the jamb nut and said tapped yoke end without interlocking effects.

In further explanation of the purpose and advantages afforded by said compensating means, it is pointed out that should complementary nuts or the equivalent thereof, be placed in tandem and fixedly held endwise within a common pocket, said double nuts when simultaneously screwed upon the threaded rod end would tend to bind or become locked thereon unless provided with a refinement of the character described.

Should both spiral nut threads not happen to exactly align for proper rod mesh, a heavy axial screw thrust would ordinarily be exerted between such confined plural tapped members, and in the majority of run trials, a jamb action would be set up between certain of said memers that leads to a burring up of the threads or a twisting off of the rod thread. My improvements obviate such defects and otherwise expedite the rapid and flawless assembly of multiple female screw parts upon a single screw part.

When my axially shiftable spindle $B_1$ is made to carry the threaded rod end into initial engagement with the foremost of said plural nut elements, the rotating spindle readily threads the rod end through such first nut, but in seeking engagement with the next following tandem nut, said compensating block is allowed to yieldably recede in order to correct for thread displacement or failure of the rod to immediately enter the second of said nuts. As will be understood, the component screw parts to be assembled, are not always uniformly or perfectly fabricated, and at times the rod thread because of such deficiencies, is required to make a number of idle turns before the rod end becomes properly centered and thread engagement actually occurs with respect to the second or next following nut. Under such circumstances and by virtue of my block device, one of said plural nut elements is in the meantime allowed to run up on the rod thread while the unentered advancing rod end is made to push the adjacent nut along, all without damage to my assembly machine or the screw parts being operated upon. It will be obvious that the more vital feature of the described relief device resides in my retractable block such as $C_{10}$ rather than in the less essential nut spacing provision as embodied in the partition collar $C_8$. In the showing made in Fig. 5, said compensating block is designed to relieve the second of such tandem nuts while in Fig. 10, this provision is reversely applied to relieve the first entered nut with respect to the next following tandem nut, the result accomplished being however, substantially identical in either case.

An uninterrupted supply of component yoke-end parts may be fed into the lower block compartments in any convenient manner; this purpose is served by the magazine feeder block $C_2$ as provided with a through nut slot $C_{12}$ and a similar yoke-end slot $C_{13}$, each made sufficiently long to store a quantity of the respective parts therein as is indicated by dotted lines in Fig. 4. These feed slots are intended to register in outline with the respective shapes given to the cooperating holder recesses $C_7$ and $C_9$, and for convenient charging the slot $C_{13}$ may be provided with finger grooves such as $C_{15}$.

The operation of this simple type of magazine is fairly obvious; assuming its slots $C_{12}$ and $C_{13}$ to be charged and that the holder block pockets $C_1$ and $C_9$ are still unfilled, then by swinging the upper block $C_2$ from its skewed position shown in Fig. 5 into registry with the lower block, this will cause one of the jamb nuts to drop into the holder compartment $C_7$ and a separate yoke-end to fall into the recess $C_9$ as indicated in dotted lines. After the threaded rod such as $D_1$ has been screwed through both the confined nut and into the yoke-end shank, the upper block $C_2$ may thereupon be returned into its skewed position which allows the assembled rod parts to be removed as a unit from the die block.

The cooperative action on part of the cited head and tail stock features, may be more readily traced by reference to Fig. 7A which shows the component yoke-end parts which the previously described type of machine is intended to assemble. As initially supplied, such unassembled yoke-end parts preferably comprise a male rod portion $D_1$ having fully completed threads $D_2$ that extend to one of its ends and is equipt at its other end with an integrally forged yoke $D_3$. Such yokes are usually provided with a transversely disposed hub or fork portion $D_4$ which terminates in two spaced arms such as $D_5$ of which the respective ends may be shaped into complementary flat bosses $D_6$ having aligned holes $D_7$ serving to carry a fulcrum pin therethrough. The hexagon jamb nut $D_8$ as used for present purposes is preferably tapped to fit the thread $D_2$ and there is further shown a separately forged female yoke-end $D_9$ having a shank $D_{10}$ tapped at $D_{11}$ to also fit said rod threads.

Assuming now that my magazine style of tail stock C has been charged with a supply of nuts and properly shifted in place to suit the length of work to be assembled, also that the drive pulley $B_4$ has been put in motion while the treadle $B_{15}$ is kept raised as shown in Fig. 1, then the spaced fork arms $D_5$ of the rod $D_1$ may readily be inserted "on the fly" into the mouth of the rotating chambered drive member $B_{10}$ in the slidably seated fashion indicated by Fig. 3 whereby said yoke end rod $D_1$ becomes rotatively interlocked with the impelling member $B_9$ is made ready to impart a screwing-up movement thereto. The free threaded rod end $D_2$ may then be dropped into the block depression $C_{18}$ and brought into substantial alignment with the axis of the jamb nut $D_8$, it being understood that my machine may readily be adjusted to assemble a particular run of substantially similar screw-parts, which in turn reduces to a minimum the ineffectual travel on part of the manipulative spindle movement designated as $S_1$. By gently stepping upon the foot treadle $B_{15}$, the spindle $B_1$ may now be axially shifted toward the tail stock to take up any end play and exert a thrust lengthwise of the rod $D_1$ and thus facilitate entrance of the rotating rod end $D_2$ into the confined jamb nut. As a result, the threaded rod together with its fork will thereupon be drawn toward the tail stock and also toward the separate yoke end $D_9$ as held within its spaced holder block compartment $C_9$. After the threaded rod end has been entirely run through said nut, continued rod rotation causes the screw to enter the tap $D_{11}$ of the adjacent yoke-end $D_9$; the compensating slide block $C_{10}$ is allowed to recede slightly in order to maintain proper thread spacing and prevent binding between the nut and the rod shank tap $D_{11}$ and to otherwise compensate for dimensional irregularities in the fabricated yoke-end parts. This operation is further facilitated by means of the partition collar $C_8$ which obviates jamming of the nut while screwing up the rod thread into the yoke shank.

Owing to the fixed spacing held between the head and tail stocks of my machine, the extreme follow-up thrust movement allowed the spindle manipulation is limited to the space marked $S_1$ and of which a rather definite but minor portion is usually spent in taking up initial endwise slack between the separate yoke-end parts. The ultimate distance to which it is intended to screw up the rod thread $D_2$ is somewhat greater than the space $S_1$ and is dependent in part upon taking up the additional pin lap marked $S_2$ (see Fig. 3). It will be observed that after the manual follow-up spindle movement $S_1$ has been entirely spent, any further screwing up of the rod will cause the forked yoke arms $D_5$ to be progressively drawn away from the bottom $B'_{10}$ of the impelling chamber until finally the spaced arm ends will be brought free of the impelling pin $B_{11}$. Thereupon the rotating spindle automatically ceases to further screw up the rod $D_1$ and the released rod end is allowed to ride freely within the mouth portion of the cylindrical chamber $B_{10}$.

It will be observed that as a first step, the manipulative axial stroke given to my rotating spindle $B_1$, finally brings its clutch flange $B_6$ into abutment with the adjacent shoulder of spindle bushing $B_2$ and prior to which time, both the spindle and the chucked rod $D_1$ are shifted in unison; thereafter however and during the continued screwing up of my female or nut parts such as $D_8$, the spindle is no longer allowed to follow up the resulting progressive rod movement, instead the rod is made to wholly withdraw out of chucked engagement with the impelling member while said spindle is purposely held stationary in its arrested abutment position. The assembled link distance will therefore be invariably held to one and the same length, there being no intermediary resilient members nor slip type of friction clutches here needed such as would be likely to allow the aforesaid link length under varying degrees of fit tightness or like ordinary thread obstructions. In addition, the described nut holder members are so devised that failure on part of the rod thread $D_2$ to immediately engage with the first of said plural nuts elements, merely causes a slight dwell in descent of the treadle $B_{15}$ but this in no wise affects the ultimate link length to which it is desired to assemble my screw parts, irrespective of any reasonable fabricative variations in respective elements thereof.

The screwing-up function of my machine is now completed and it merely remains to again throw the feed chamber $C_2$ into its skewed position to facilitate removal of the assembled yoke-end members then screwed together into the fashion shown in Fig. 7B and in which a substantially fixed distance "L" can be maintained between the opposite pin holes $D_7$ and $D'_7$. Owing to inexactness of the usual threading processes, the complementary yoke-ends $D_3$ and $D_9$ would not necessarily fall into the common plane indicated but are more likely to leave my machine set up in different angular relations. As a final step, the separate yoke-end $D_9$ may be slightly turned into a specified fixed relation to its mate and whereupon the jamb nut $D_8$ may be drawn up to lock such adjusted parts in place, all of which supplementary operations may be done in any convenient manner, preferably after the assembled parts have been removed from said machine.

Such final adjustment need not materially change the original span "L" and it will be apparent that the ability to screw up the component rod elements with rapidity and certainty into the substantially equal assembled lengths, represents an important feature of the present invention and one that materially reduces the cost of labor and fabrication over conventional hand assembly methods. In the event it is desired to work with any other span length between the rod ends, this can readily be accomplished by slidably adjusting the tail stock carriage to suit the work in hand or should it be deemed advisable to alter the length of engaged screw threads, it is merely necessary to correspondingly adjust the stop nuts $B''_7$ or to change the pin lap $S_2$.

In Fig. 8 there is shown a machine of the duplex type that embodies underlying principles substantially similar to those described in connection with Fig. 1 but modified to provide for twin tail stocks B and B', each equipt with its own spindle respectively adapted to screw right-hand and left-hand rod threads into the opposite ends of a turnbuckle connector or the like. For such purposes, it is preferred to resort to the intermittent type of impeller drive embodying the alternative clutch spindle structure disclosed in Fig. 3A where the relative short coupling pins $B_{25}$ freely pull out of their registering flange apertures whenever the treadle $B'_{15}$ assumes a raised position as shown in Fig. 8.

My duplex machine is adapted to operate upon the unassembled parts such as are indicated in Fig. 11A, which comprise two complementary yoke-end pieces each provided with an integral rod portion $D_1$ substantially similar to that described in connection with Fig. 7A except that the respective rod ends are here cut with right-hand and left-hand threads $D_2$ and $D'_2$. The jamb nuts $D_8$ and $D'_8$ are also provided with opposite hand threads while the respective ends of the turnbuckle $D_{12}$ are likewise tapped with corresponding threads $D_{13}$ and $D'_{13}$. These individual parts are then handled by my machine to bring them into the assembled relation represented by Fig. 11B in which the spaced yoke-end boss holes $D_7$ are again screwed up to a predetermined fixed span $L'$.

A magazine chamber similar to the one previously described but modified to suit present purposes, is illustrated in Figs. 9 and 10. The lower holder or die block $C'_1$ of this magazine may be provided with a pair of oppositely disposed recesses $C'_7$ respectively intended to embrace right-hand and left-hand jamb nuts and therebetween is a turn-buckle compartment $C'_9$ separated from said nut recesses by the partition collars $C'_8$. It is preferred to feed down the turn-buckles in the sidewise fashion indicated by dotted lines and to shape the compartment $C'_9$ so it will hold the tapped turn-buckle ends $D_{13}$ and $D'_{13}$ in alignment with the center line X—X, thus allowing the respective male rod end to be readily entered after having been screwed through its confined nut member.

In this instance, the superimposed magazine or feed chamber block $C'_2$ is made to slide laterally away from said axis X—X into its inoperative position shown in Fig. 10, such shifting being facilitated by the spaced guide lugs $C_{16}$ and the stop pins $C'_4$. For the purpose of clearing the upstanding turn-buckle side when seated in the lower block, the upper block may be provided with a clearance slot $C_{17}$. As regards the pair of modified compensating blocks $C'_{10}$ as used in the present instance, they are respectively placed adjacent to and made to define the outer end portion of the complementary nut recesses $C'_7$, the blocks being resiliently held in place by means of the coiled springs such as $C'_{11}$. These retractable blocks are here made to serve an additional purpose; namely, should the turn-buckle ends for any reason become inadvertently reversed with respect to the hand of the nut and rod threads, then after the rod has been screwed through the nut, it will fail to enter the incorrect turn-buckle thread and instead merely pivot thereon but the engaged jamb nut will in the meantime continue to recede from the rod end. To provide for such contingency, said receding nut is allowed to pull back the compensating block $C'_{10}$ without harm to any of the machine parts, it being apparent that any outward movement on part of the blocks serves as a signal for the operator to shut down his machine.

In view of the rather explicit description devoted to the simpler Fig. 1 type of machine, it is thought the mode of operation applying to my duplex machine will be apparent. In order to trace minor points of difference, the complementary power-driven pulleys $B_4$ and $B'_4$ rotate continuously while the duplex machine remains in operation but because of the disengageable coupling pins $B'_7$ here used, both their impelling members may be brought to a standstill while a new set of forked yoke-ends $D_1$ or $D'_1$ are being inserted into the respective gripping jaws $B_{23}$. Assuming the magazine feed block $C'_2$ to have been shifted into alignment with its holder block $C_1$, then the latter will become charged with a properly positioned turn-buckle together with a set of correctly placed jamb nuts therefor, all as described in connection with Fig. 9.

With the foot treadle $B'_{15}$ in its free raised position as shown in Fig. 8, the linked up shiftable members respectively associated with my double spindles will then be standing outwardly into their extreme separated positions as shown in Fig. 3A, and this facilitates the insertion and tandem mounting of the rods $D_1$ and $D'_1$ therebetween while these spaced parts remain at rest. By now pressing down on said treadle, both of the complementary flanges $B_{18}$ will be moved longitudinally inwardly which in turn puts an endwise thrust upon the inserted yoke rods until their respective threaded ends are made to abut the corresponding block encased jamb nuts $D_8$ and $D'_8$. Meanwhile the pointed coupling pins $B'_7$ will have been entered into their respective pulley apertures $B_8$ which causes each of the driven rods $D_1$ and $D'_1$ to be rotated in proper direction adapted to screw up the respective rod ends to a given overall length and assembled in the fashion shown by Fig. 11B. The desired degree of screwing-up movement is again limited by initially taking up the idle space $S_1$ of Fig. 3A and thereupon having the clutch pin $B_{25}$ pull free of the flange $B_{18}$ to take up as before the additional lateral spacing marked $S_2$. it being the intent to have the pivoted jaws $B_{23}$ maintain their grip behind the fork hub $D'_4$ and to slide therewith as a unit while the rod drive clutch is being disengaged.

Although Fig. 8 shows a machine adapted to operate upon a fixed line of rod ends of equal length, it will be understood that my machine can also be designed with adjustable head stocks and different styles of magazine chambers to handle any kind of work that may fall within same underlying functional principles. It will also be evident that various other changes in the details and arrangement of my described device may be resorted to, all without departing from the spirit and scope of my invention heretofore set forth and more particularly pointed out in the appended claims.

Claims:

1. In a machine for cooperatively assembling a group of threaded male parts adapted to be screwed into a cooperating group of female parts, a power impelled means serving to impart a limited screwing-up movement to one group of the aforesaid parts, and holder means retaining the other group of parts for thread engagement with the first named group of parts.

2. In a machine for assembling mated screw-like parts, impelling means comprising an axially shiftable rotary spindle adapted to impart a screwing-up movement to one of said parts through a releasable drive connection, means for manually initiating an axial shift of the spindle within definite limits, holder means serving to retain the other part and to facilitate thread engagement with the first named part, said impelling means serving to automatically release said drive connection subsequent to the manual placing of the rotary spindle in a limit position.

3. In a machine for assembling mated screw-like parts, impelling means including an axially shiftable rotary spindle adapted to impart a limited screwing-up movement to the male part of said screw parts, there being a disengageable coupling means provided between said impelling means and said male part, stationary holder means adapted to retain the female screw part to facilitate thread engagement with the male part and which male part is first idly rotating and moved toward said female part by the shiftable spindle, and control means for said coupling means, the disengagement of the coupling means from the male part meing made positively dependent upon the extent to which said parts have become screwed together but being independent of the number of idle spindle turns required to start engagement between said screw parts.

4. In a machine for assembling mated male and female screw parts, impelling means including an axially shiftable rotary spindle member adapted to anchor the male screw part and impart a screwing-up movement thereto, said anchorage being of the slip type allowing the male part to be progressively withdrawn from said member in a fixed direct relation to ultimate thread engagement, and a stationary holder means retaining the female screw part for thread engagement with said male part and which last named part is first idly rotated and moved toward said female part by the shiftable spindle and thereupon is automatically withdrawn free of said rotating member when said threaded parts having been screwed together to a predetermined fixed length irrespective of the number of idle spindle turns required prior to initial thread engagement.

5. In a machine for assembling mated screw-like parts, impelling means including a rotary member mounted to shift axially toward an abutment and equipt with means adapted to releasably anchor the male element of said screw parts for imparting a limited screwing-up movement thereto, said releasable anchorage means being of the slip type allowing the aforesaid part to be withdrawn while in rotation, stationary holder means retaining the thread axis of the female part in substantial alignment with that of said male part, and manipulating means for manually following up said shiftable member to facilitate initial interlocking of the respective screw threads and to shift the spindle into stop engagement with said abutment, the male screw part being thereupon progressively withdrawn from anchorage to limit the further screwing up of the interlocked screw threads beyond a fixed predetermined length.

6. In a machine for assembling mated male and female parts, impelling means including an axially shiftable spindle for imparting a screwing-up movement to the male part, stationary holder means adapted to receive and removably retain the female screw part for thread engagement with the first named part, means adapted to automatically release the impelling means for positively restricting to a fixed number the turns to which said parts are allowed to screw together, and magazine feeder means adapted to replenish said stationary holder with said female screw part after removal of the parts assembled.

7. In an assembly machine for screwing up a pair of threaded male parts into a group of cooperating female parts of which one such serves to interconnect said male parts, impelling means for imparting a screwing-up movement to each of said male parts, pocketed holder means adapted to receive and removably retain said group of female parts in fixed order for screw assembly upon the respective male parts, and magazine feed means serving to simultaneously supply the holder with new group of female parts in the aforesaid order after removing the parts assembled.

8. In a machine for assembling complementary male and female screw parts adapted to be locked together by jamb nut means, holder means provided with separate pockets respectively serving to retain said female part and said nut means in substantial thread alignment against relative rotation, and impelling means adapted to successively screw the male part into the retained nut means and the female part.

9. In a machine for screwing up a threaded male part and assembling several cooperating female parts thereon, holder means provided with adjacent pockets partitioned by intermediary collar means, each such pocket being adapted to separately retain one of the respective female parts, and impelling means adapted to successively screw the male part into the retained female parts.

10. In a machine for screwing up a threaded male part and assembling several cooperating female parts thereon, holder means provided with spaced pocket means respectively adapted to retain the several female parts in substantial axial alignment, compensating block means for one of said pockets, and impelling means serving to screw the male part into the retained female parts.

11. In an assembling machine for screwing up a pair of threaded male parts into a group of female parts including one such adapted to interconnect said male parts, holder means serving to retain two such female parts in spaced relation with the aforesaid interconnecting part interposed therebetween, compensating block means cooperating with each of the female parts disposed contiguous to the opposite ends of said holder means, and impelling means adapted to impart a screwing-up movement to the male parts for respective thread engagement with the last named female parts.

12. In an assembling machine for screwing up a pair of oppositely threaded male parts into a group of cooperating female parts adapted to interconnect and lock the male parts together, separate impelling means for reversely rotating the respective male parts, holder means retaining the said group of threaded female parts against rotation while the male parts are being screwed therein, and control means for automatically limiting the screwing-up movement of the respective male parts.

13. In a machine for assembling mated male and female screw parts, an axially shiftable impelled spindle means having an abutment serving to arrest the spindle shift in one axial direction, said spindle means including a chuck-like member adapted to releasably connect with the male screw part for imparting a limited screwing up thereto, and stationary holder means retaining the female screw part in predetermined spaced relation to said abutment for thread engagement with the male part, the last named part being automatically disconnected from said rotating chuck while said spindle is maintained in arrested position.

14. In a machine for assembling mated male and female screw parts, an axially shiftable impelled spindle means having an abutment serving to arrest the spindle shift in one axial direction, said spindle means including a chuck-like member adapted to releasably connect with the male screw part for imparting a limited screwing up thereto, and stationary holder means retaining the female screw part in predetermined spaced relation to said abutment for thread engagement with the male part, the last named part being automatically disconnected from said rotating chuck while said spindle is maintained in arrested position, and control means for changing the spacing between the holder and said spindle abutment.

15. A machine adapted to simultaneously assemble a plurality of companion nut elements on to a single male screw part, retaining means serving to removably hold said plural nut elements in substantial axial alignment, impelling means adapted to successively enter the screw into said nut elements, and relief means cooperating with one of the nut elements to provide against its jamming against the other.

16. A machine adapted to assemble a single male screw part into a plurality of mated female parts, means retaining said female parts in separated tandem relation for thread engagement with said male part, means for simultaneously screwing the male part through said plural parts, and relief means associated with one of said female parts to prevent relative jamming of said female parts.

17. The method of assembling in a single operation, a plurality of female nut elements upon a single screw-threaded male part consisting in causing releasable impelling means to successively bring said male part into cooperative relation with the plural nut elements, and in simultaneously advancing said female nut elements on to said male part in non-interfering spaced relationship until the nut elements have assumed a predetermined position on said male part.

18. The method of assembling in a single operation, a plurality of female nut elements upon a single screw-threaded male part consists in causing releasable impelling means to successively bring said male part into cooperative relation with the plural nut elements, and in simultaneously advancing said female nut elements on to said male part in non-interfering spaced relationship and thereupon releasing the impelling means when the nut elements have assumed a predetermined position on said male part.

In testimony whereof, I have herewith set my hand this 18th day of August, 1927.

CHARLES H. BATES.